United States Patent Office 3,050,530
Patented Aug. 21, 1962

3,050,530
IMPROVED PROCESS FOR THE PREPARATION OF 3-(2-ETHYL-2-NITROVINYL) INDOLE
Jacob Szmuszkovicz, Portage Township, Kalamazoo County, Mich., assignor to The Upjohn Company, Kalamazoo, Mich., a corporation of Delaware
No Drawing. Filed Sept. 29, 1960, Ser. No. 59,154
3 Claims. (Cl. 260—319)

This invention relates to an improved process for the preparation of 3-(2-ethyl-2-nitrovinyl)indole.

This application is a continuation-in-part of application Serial Number 48,348, filed August 9, 1960, now abandoned.

The compound 3-(2-ethyl-2-nitrovinyl)indole (I) is an intermediate in the preparation of 3-(2-aminobutyl)indole, commonly designated α-ethyltryptamine. The conversion of (I) to α-ethyltryptamine can be accomplished readily by reduction, for example, using lithium aluminum hydride according to the procedure described in British Patent 807,876. α-Ethyltryptamine is active as an enzyme inhibitor, for example in the inhibition of monamine oxidase, and can be used as a psychic energizer in mammals.

The preparation of 3-(2-alkyl-2-nitrovinyl)indoles, including (I), by condensation of indole-3-carboxaldehyde with the appropriate 1-nitroalkane in the presence of catalysts such as ammonium acetate, benzylamine, n-butylamine, methylamine, and the like, has been described previously; see, for example, Young, J. Chem. Soc. 3493, 1958, and Ash and Wragg, ibid., 3887, 1958. The prior art methods give excellent yields when applied to the preparation of 3-(2-methyl-2-nitrovinyl)indole from indole-3-carboxaldehyde and nitroethane. However, when applied to the preparation of the next higher homolog, namely, the compound (I), the prior art methods give only moderate yields. I have now found that markedly improved yields in the preparation of (I) by condensation of indole-3-carboxaldehyde with 1-nitropropane can be obtained using reaction conditions to be described hereinafter.

Accordingly, it is an object of the present invention to provide an improved process for the preparation of (I) whereby this compound, and hence α-ethyltryptamine, can be produced more efficiently and economically.

The process of the invention comprises an improved process for the preparation of 3-(2-ethyl-2-nitrovinyl)indole by condensation of indole-3-carboxaldehyde and 1-nitropropane in the presence of ammonium acetate at a temperature within the range of about 70° C. to the boiling point of the reaction mixture, characterized in that water produced in the condensation is removed from the reaction mixture by entrainment of the vapor thereof in a continuous stream of inert gas.

In carrying out the process of the invention it is advantageous to employ an enclosed reaction vessel fitted with an appropriately situated gas inlet, and an exit in the upper wall of the vessel above the level of the reaction mixture. The vessel is charged with indole-3-carboxaldehyde, 1-nitropropane, and ammonium acetate and the mixture is stirred and heated at the desired temperature within the range given above. The upper limit of temperature is the boiling point of the reaction mixture. Preferably the reaction is conducted at atmospheric pressure in which case the boiling point is approximately 130° C. If desired, however, the reaction can be conducted at superatmospheric pressure in which case the boiling point will be higher than 130° C. depending on the particular pressure employed.

Throughout the course of the reaction a continuous stream of inert gas is passed through the free space in the reaction vessel, or alternatively and preferably, is passed through the reaction mixture. The inert gas employed can be any gas which is inert under the conditions of the reaction, i.e., does not enter into reaction with one or more of the reactants or interfere with the course of the reaction in any way. Examples of inert gases are nitrogen, argon, helium, xenon, neon, krypton, and the like. The preferred inert gas is nitrogen. Advantageously, the effluent gas from the reaction vessel is passed through a condenser to recover the 1-nitropropane which together with water vapor is removed from the reaction vessel by entrainment in the inert gas.

The reaction time employed in the process of the invention varies within wide limits depending upon the scale on which the reaction is conducted, the temperature at which the reaction is conducted, and the rate at which the inert gas is allowed to flow. Generally speaking, a reaction time within the range of about 0.5 hr. to about 8 hr. is satisfactory though longer reaction times, while not necessary, are not deleterious. At the end of the chosen reaction time the reaction mixture is allowed to cool whereupon the desired product (I) separates and can be isolated by conventional procedures, for example, by filtration followed by drying. The material so obtained is essentially pure (I) and can be used, without further purification, in the preparation of α-ethyltryptamine by the process hereinbefore described.

The rate at which the inert gas is passed through the atmosphere over the reaction mixture or alternatively through the reaction mixture influences the yield of (I) obtained in the process of the invention. The optimum rate of passage of the gas varies according to the scale on which the reaction is conducted, the time for which the reaction is conducted, and also the amount of free space in the reaction vessel. For example, on a small scale of operation, i.e., using of the order of 100 g. of indole-3-carboxaldehyde and a reaction time of the order of 1 hr., it is advantageous to employ a rate within the range of about 5 cu. ft. to about 50 cu, ft. per hr. per mole of indole-3-carboxaldehyde employed in the reaction; preferably the rate of passage of the inert gas on this scale of operation is within the range of about 10 cu. ft. to about 30 cu. ft. per hr. per mole of indole-3-carboxaldehyde. Using a larger scale of operation, i.e. of the order of 10 to 50 kg. of indole-3-carboxaldehyde and a reaction time of 2 to 5 hr. it is advantageous to employ a rate within the range of about 0.5 cu. ft. to about 5 cu. ft. per hr. per mole of indole-3-carboxaldehyde employed in the reaction; preferably the rate of passage of the inert gas on the larger scale is within the range of about 0.75 cu. ft. to about 3 cu. ft. per hr. per mole of indole-3-carboxaldehyde.

The molar proportions of the reactants employed in the process of the invention also influence the yield of (I) obtained therein. Advantageously, the 1-nitropropane is present in excess of the stoichiometric proportion, the excess of 1-nitropropane serving as solvent for the reaction mixture. Preferably the 1-nitropropane is present in the proportion of about 5 moles to about 15 moles per mole of indole-3-carboxaldehyde.

The amount of ammonium acetate employed in the process of the invention can be varied within wide limits. Generally speaking the ammonium acetate is employed in catalytic quantity, i.e., in an amount less than 1 mole per mole of indole-3-carboxaldehyde. Advantageously, the ammonium acetate is present in the reaction mixture in an amount within the range of about 0.1 mole to about 0.9 mole per mole of indole-3-carboxaldehyde. Preferably, the ammonium acetate is present in the reaction mixture in an amount within the range of about 0.2 mole to about 0.5 mole per mole of indole-3-carboxaldehyde.

The operation of the process of the invention results in high yields of the compound (I), which yields represent a marked improvement over those which can be obtained by processes hitherto described. Accordingly, the process of the invention enables the compound (I), and hence the therapeutically valuable compound, α-ethyltryptamine, to which (I) can be converted, to be produced more efficiently and at reduced cost.

The following examples are illustrative of the process and product of the present invention, but are not to be construed as limiting.

EXAMPLE 1

A mixture of 2.15 g. (0.0149 mole) of indole-3-carboxaldehyde, 15 ml. (0.169 mole) of 1-nitropropane, and 0.43 g. (0.0056 mole) of ammonium acetate was placed in a 50-ml., 3-necked flask fitted with stirrer and gas inlet and outlet tubes. The outlet tube was provided with a condenser set downward for distillation. Nitrogen was passed through the space above the reaction mixture throughout the reaction at a rate of 110 to 150 ml. per minute. The mixture was heated on the steam bath with stirring for 1.25 hr. A total of 5.5 ml. of distillate was collected during this period. The reaction mixture was then cooled in ice for 0.5 hr. with occasional stirring. The solid which had separated was then isolated by filtration, washed with three 5-ml. portions of water, then with two 10-ml. portions of petroleum ether (boiling range of 30° C. to 60° C.) before being tried. There was thus obtained 2.3 g. of 3-(2-ethyl-2-nitrovinyl)indole having a melting point of 129° C. to 132° C. and a purity of 99% as measured by comparison of the extinction coefficient at λ max.=400 millimicrons with that of a pure specimen of the compound.

EXAMPLE 2

A mixture of 50 kg. (345 moles) of indole-3-carboxaldehyde and 12.5 kg. (162 moles) of ammonium acetate was charged under a nitrogen atmosphere into a steam-jacketed reaction vessel fitted with a stirrer, inlet for nitrogen, and a condenser set for distillation. The reaction vessel was then purged with nitrogen before adding 283 kg. (3179 moles) of 1-nitropropane under a nitrogen atmosphere. The mixture was then heated at 95° C. for 3 hours with stirring. Throughout this period of heating nitrogen was passed through the free space in the reaction vessel at a rate of 400 cu. ft. per hr. After the period of heating was completed the reaction mixture was cooled to approximately 12° C. and was maintained at this temperature with stirring for 1 hr. The solid which had separated was isolated by filtration, washed with three 15-gal. portions of deionized water and then with two 10-gal. portions of Skellysolve B (a mixture of hexanes). The washed solid was dried in a vacuum oven at a temperature of 25° C. to 30° C. There was thus obtained 50 kg. of 3-(2-ethyl-2-nitrovinyl)indole having a purity of 99% as determined by spectrographic and paper chromatogram analyses.

EXAMPLE 3

Using the procedure described in Example 2, but employing 10 kg. (69 moles) of indole-3-carboxaldehyde, 2.5 kg. (32.4 moles) of ammonium acetate, and 56.6 kg. (636 moles) of 1-nitropropane, bubbling nitrogen through the reaction mixture at a rate of 100 cu. ft. per hour, and employing a reaction time of 2 hrs., there was obtained 11.7 kg. of 3-(2-ethyl-2-nitrovinyl)indole having a purity of approximately 99% as determined by spectrographic and paper chromatogram analyses.

EXAMPLE 4

Using the procedure described in Example 2, but employing 28.25 kg. (195 moles) of indole-3-carboxaldehyde, 5.9 kg. (76.6 moles) of ammonium acetate, and 134 kg. (1505 moles) of 1-nitropropane, bubbling nitrogen through the reaction mixture at a rate of 400 cu. ft. per hour and employing a reaction time of 2 hrs., there was obtained 34.8 kg. of 3-(2-ethyl-2-nitrovinyl)-indole having a melting point of 133.5° C. to 136.5° C. and a purity of approximately 99% as determined by spectrographic and paper chromatogram analyses.

EXAMPLE 5

Using the procedure described in Example 2, but employing 30 kg. (207 moles) of indole-3-carboxaldehyde, 6.3 kg. (81.8 moles) of ammonium acetate, and 142 kg. (1595 moles) of 1-nitropropane, bubbling nitrogen through the reaction mixture at a rate of 400 cu. ft. per hr. and employing a reaction time of 2 hrs., there was obtained 34.85 kg. of 3-(2-ethyl-2-nitrovinyl)indole having a purity of approximately 99% as determined by spectrographic and paper chromatogram analyses.

EXAMPLE 6

Using the procedure described in Example 2, but employing 60 kg. (414 moles) of indole-3-carboxaldehyde, 12.5 kg. (162.5 moles) of ammonium acetate, and 283 kg. (3179 moles) of 1-nitropropane, bubbling nitrogen through the reaction mixture at a rate of 400 cu. ft. per hr., and employing a reaction time of 3 hr., there was obtained 68.92 kg. of 3-(2-ethyl-2-nitrovinyl)indole having a melting point of 131.5° C. to 136.5° C. and a purity of approximately 99% as determined by spectrographic and paper chromatogram analyses.

EXAMPLE 7

Using the procedure described in Example 2, but employing 60.85 kg. (420 moles) of indole-3-carboxaldehyde, 12.5 kg. (162.5 moles) of ammonium acetate, and 283 kg. (3179 moles) of 1-nitropropane, bubbling nitrogen through the reaction mixture at a rate of 400 cu. ft. per hr., and employing a reaction time of 4 hr., there was obtained 75.59 kg. of 3-(2-ethyl-2-nitrovinyl)indole having a melting point of 131.5° C. to 135.5° C. and a purity of approximately 99% as determined by spectrographic and paper chromatogram analyses.

I claim:

1. An improved process for the preparation of 3-(2-ethyl-2-nitrovinyl)indole by condensation of indole-3-carboxaldehyde and 1-nitropropane in the presence of ammonium acetate at a temperature within the range of about 70° C. to the boiling point of the reaction mixture, characterized in that water produced in the condensation is removed from the reaction mixture by entrainment of the vapor thereof in a continuous stream of inert gas.

2. An improved process for the preparation of 3-(2-ethyl-2-nitrovinyl)indole which comprises heating a mixture of indole-3-carboxaldehyde and 1-nitropropane, wherein the 1-nitropropane is present in the amount of about 5 moles to about 15 moles per mole of indole-3-carboxaldehyde, in the presence of a catalytic quantity of ammonium acetate, at a temperature within the range of about 70° C. to the boiling point of the reaction mixture, and removing water produced in the condensation by entrainment of the vapor thereof in a continuous stream of inert gas.

3. An improved process for the preparation of 3-(2-ethyl-2-nitrovinyl)indole which comprises heating a mixture of indole-3-carboxaldehyde and 1-nitropropane, wherein the 1-nitropropane is present in the amount of about 5 moles to about 15 moles per mole of indole-3-carboxaldehyde, in the presence of a catalytic quantity of ammonium acetate, at a temperature within the range of about 70° C. to the boiling point of the reaction mixture, and passing a continuous stream of inert gas through the reaction mixture at a rate of about 0.5 cu. ft. to about 50 cu. ft. per hour per mole of indole-3-carboxaldehyde present in the reaction mixture.

References Cited in the file of this patent

UNITED STATES PATENTS

| 2,758,135 | Miller | Aug. 7, 1956 |
| 2,787,634 | Coover et al. | Apr. 2, 1957 |

FOREIGN PATENTS

| 807,875 | Great Britain | Jan. 21, 1959 |

OTHER REFERENCES

Noller: Chemistry of Organic Compounds, pages 212–213 (1957), 2nd ed.

Young: J. Chem. Soc. (London), page 3493 (1958).